Aug. 8, 1939.  W. C. BLACKMOND  2,168,616
CHLORINATOR
Filed Dec. 11, 1936   3 Sheets-Sheet 1

Inventor
WILLIAM C. BLACKMOND
By Jack A. Athly
Attorney

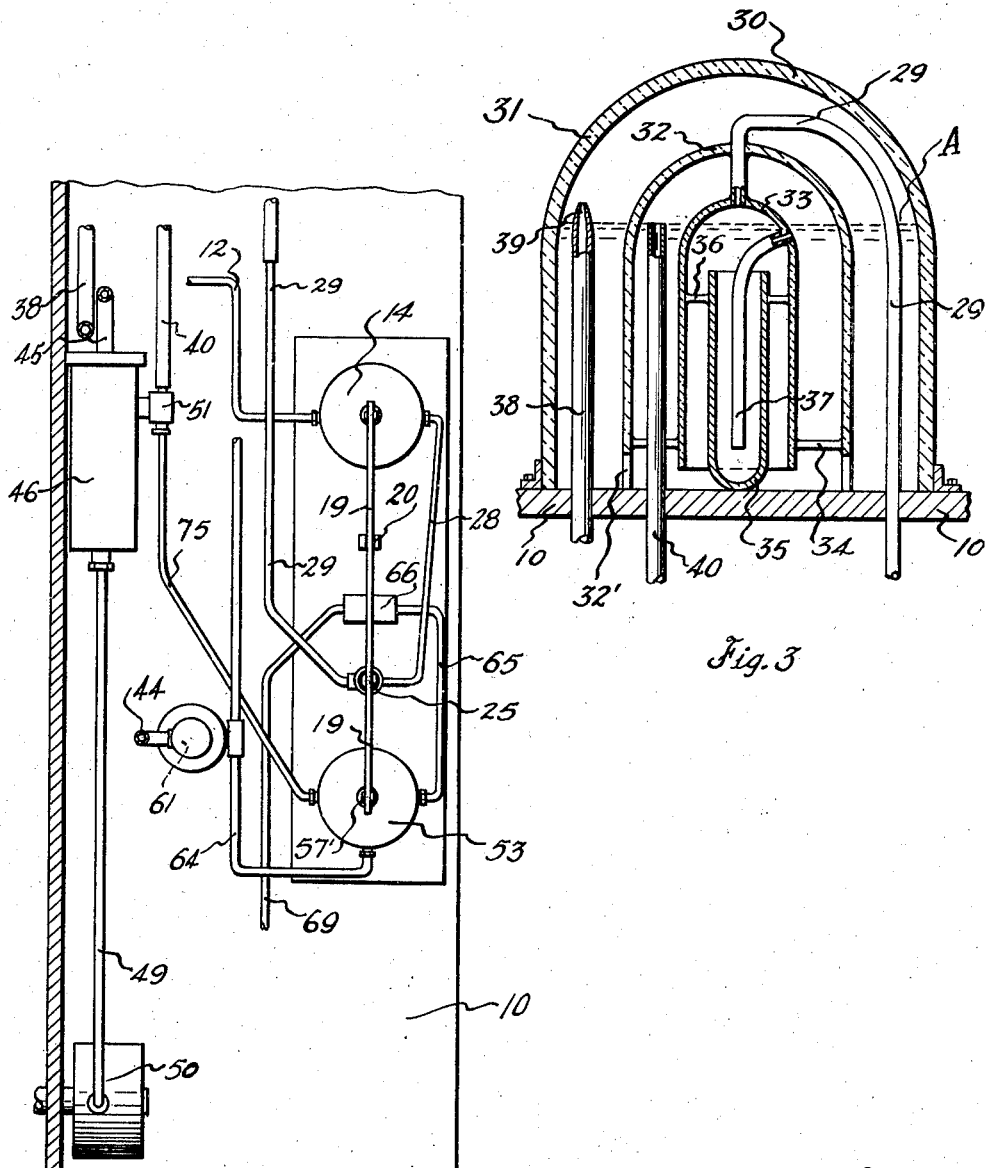

WILLIAM C. BLACKMOND

Patented Aug. 8, 1939

2,168,616

UNITED STATES PATENT OFFICE 2,168,616

CHLORINATOR

William C. Blackmond, Ranger, Tex., assignor of twenty-five per cent to Joseph H. Reynolds, Cisco, Tex.

Application December 11, 1936, Serial No. 115,342

10 Claims. (Cl. 210—28)

This invention relates to new and useful improvements in chlorinators.

This application is filed as an improvement on the chlorinating device shown and described in my prior Patent No. 1,752,723 issued April 1, 1930.

One object of the invention is to provide an improved device for controlling and metering the introduction of chlorine into a water supply line, whereby the water is sterilized.

An important object of the invention is to provide a chlorinator including an improved metering means, whereby the amount of chlorine introduced into the water may be readily ascertained; said metering means being automatically actuated and being constructed of glass, whereby it is resistive to corrosion.

Another object of the invention is to provide an improved chlorinator including means for controlling the amount of chlorine introduced into the water; said means being actuated by the pressure of the water and the chlorine, whereby the chlorine is introduced in accordance with the water supply.

A further object of the invention is to provide an improved chlorinator which is actuated by a constant pump suction supplied by a syphon arrangement, whereby the chlorine is introduced into the water at a relatively fixed rate at all times.

Still another object of the invention is to provide an improved chlorinating apparatus which is so constructed that in the event that any of the operating mechanism should fail to function, or if the water supply fails, the chlorine supply is automatically cut off.

A construction designed to carry out the invention will be hereinafter described, together with other features of the invention.

Figure 1:
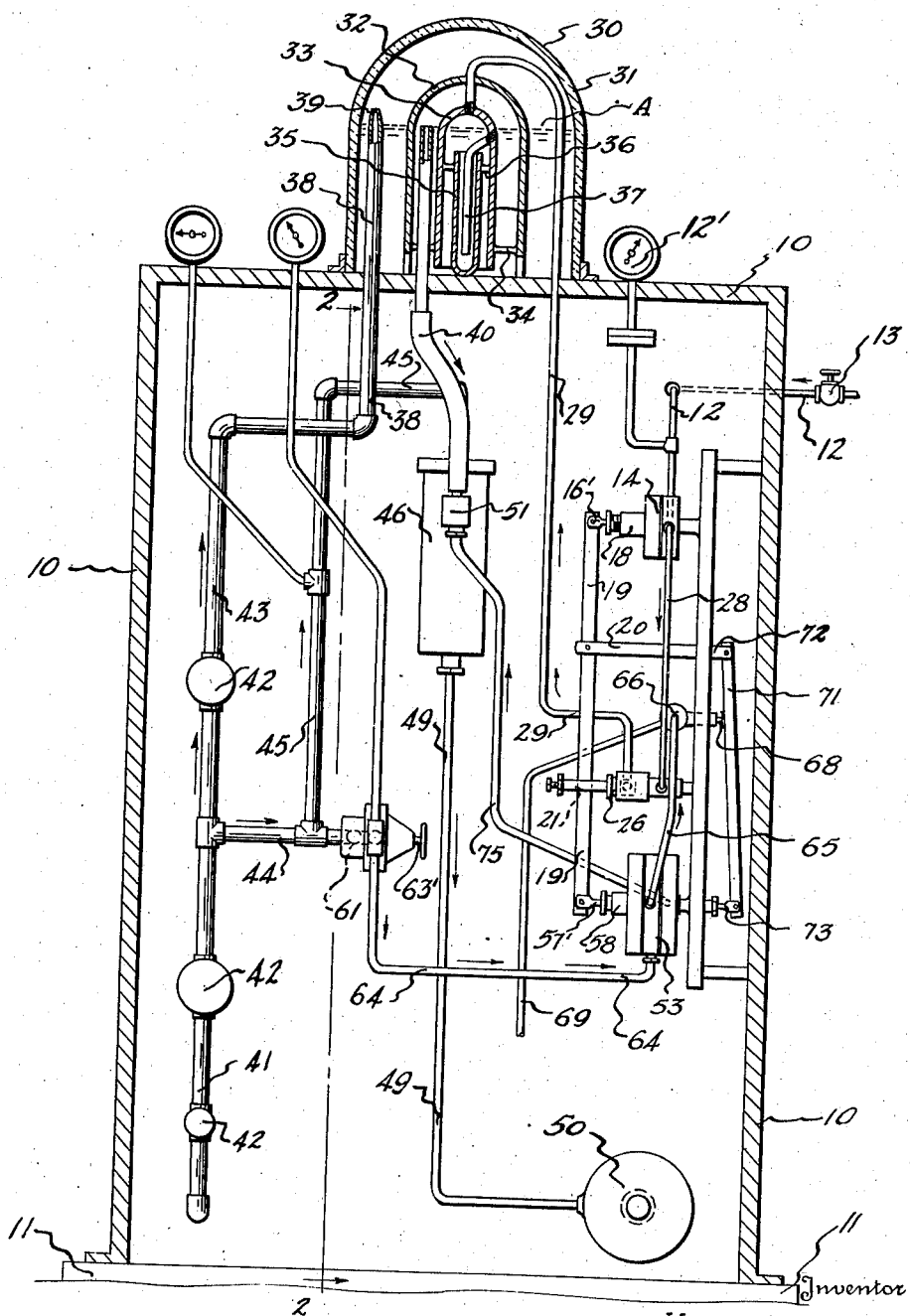
Figure 4:
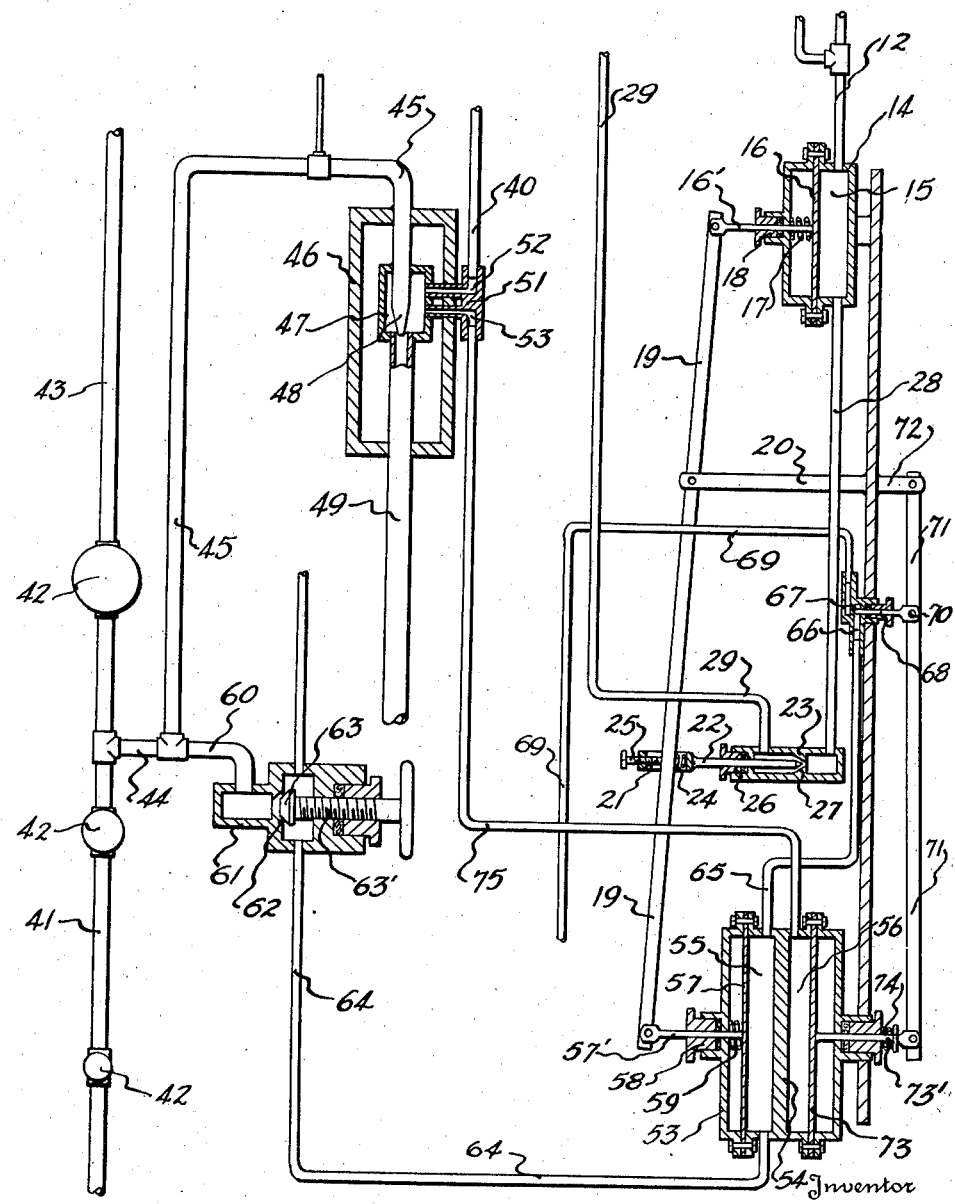

The invention will be more readily understood from a reading of the following specification and by reference to the accompanying drawings, in which an example of the invention is shown, and wherein:

Figure 1 is a transverse, vertical, sectional view of a chlorinator, constructed in accordance with the invention, Figure 2 is a transverse, vertical, sectional view, taken on the line 2—2 of Figure 1, Figure 3 is an enlarged, sectional view of the metering apparatus, and Figure 4 is a diagrammatical view, showing the various valves and diaphragm controls in section.

In the drawings, the numeral 10 designates a casing or housing which is suitably supported on a base 11. The housing may be constructed of metal, or other suitable material and is substantially rectangular in cross-section, as is clearly shown in Figure 1. All of the mechanism for controlling the inlet of chlorine, as well as for controlling the water supply is mounted within this casing, whereby a complete unit is provided.

The chlorine gas to be introduced into a water supply passes from a suitable tank or other chlorine supply through an inlet pipe 12 which extends through the wall of the casing. A suitable control valve 13 is connected in the pipe 12, whereby the introduction of chlorine through said pipe may be manually controlled. Within the casing, the pipe 12 is bent or turned downwardly and has its lower end connected in the side of a diaphragm case 14 whereby the chlorine is introduced into the diaphragm chamber 15 of said case.

The construction of the diaphragm case 14 is clearly shown in Figure 4 and includes a transverse diaphragm 16 which extends across the case within the same and forms one side of the chamber 15. With such arrangement, it is obvious that the chlorine may act upon the diaphragm 16 and thus, the pressure of said chlorine will move said diaphragm in accordance therewith. The movement of the diaphragm by the chlorine pressure is resisted by a coil spring 17 which surrounds the diaphragm stem 16', which stem extends through a stuffing box 18 provided in the wall of the casing 14. The extreme outer end of the stem 16' is pivoted to the upper end of a control bar 19. It will be obvious that the chlorine pressure acting upon the diaphragm against the tension of the spring 17 will impart a motion to the diaphragm stem 16' whereby the upper end of the bar 19 is moved.

The bar 19 is pivoted near its upper end to a horizontal support 20, whereby when the upper end of said bar is swung the lower end thereof is also swung but in an opposite direction. The bar 19 extends through a slot 21 provided in the outer end of a metering pin 22 which pin forms part of a valve 23 located below the horizontal support 20. The bar is confined within the slot 21 of said pin between a coil spring 24 and an adjusting screw 25, whereby the exact position of the bar within the slot may be varied by merely adjusting said screw. The inner end of the metering pin 22 extends through a stuffing box 26 provided in the end of the valve housing and is arranged to engage a seat 27 within said housing.

The diaphragm chamber 15 is connected with the interior of the valve housing 23 by a vertical pipe or line 28, whereby the chlorine within the chamber 15 may pass downwardly through this pipe and into said valve housing. After entering the housing the chlorine will flow past the valve seat 27 and to the opposite end of said housing and will finally escape through a conductor 29 leading from this opposite end of said housing. From the above, it will be seen that the bar 19 controls the position of the metering pin 22 with relation to the valve seat 27 and since said pin controls the amount of chlorine passing from the pipe 28 to the conductor 29 through the valve housing 23, it will be obvious that the vertical bar 19 controls the flow of chlorine from the pipe 28 to said conductor 29. As has been explained it is the pressure of the chlorine within the diaphragm chamber 15 acting against the diaphragm 16 which determines the position of the upper end of the control bar 19 and, therefore, the pressure of the chlorine being introduced through the inlet line 12 and into the diaphragm chamber 15 which positively controls the position of the metering pin 22 and thus the pressure of the chlorine controls the amount of chlorine which flows through the valve housing 23 and to the conductor 29.

The conductor 29 extends upwardly from the valve housing 23 and passes through the top of the casing 10, as is clearly shown in Figure 1. The extreme upper end of this conductor extends into a metering apparatus 30 which is mounted on top of the casing 10. The metering apparatus is clearly shown in Figure 3 and comprises an inverted shell 31 which is preferably constructed of glass, and which is suitably secured on the top of the casing. It is preferable that the shell be air and water tight so that there will be no leakage at the junction of said shell and the casing 10. Within the shell is located a pulsator which includes an inverted bell 32 which is disposed axially therein and which is constructed of the same material as the shell. The lower end of the bell 32 is suitably secured to the top of the casing 10 so as to be rigidly mounted within the shell. By observing Figure 3, it will be obvious that due to the variation in the size of the bell and the shell, there is an annular space provided between these two members. It is through this space that the conductor 29 extends and the extreme upper end of the conductor is bent to conform substantially to the shape of the inverted bell 32 and is then bent downwardly so as to extend axially through the upper end of said bell into the interior thereof.

A second inverted bell 33 is located axially within the bell 32, being supported by a transverse spider 34. It is noted that the bottom of this inner bell 33 is spaced from the top of the casing 10. The end of the conductor 29 which extends through the top of the outer bell 32 is suitably fastened in the top of the inner bell 33 whereby the chlorine which is passing upwardly through the conductor 29 may enter the interior of the inner bell 33.

A tube 35 having its lower end rounded and its upper end open is positioned axially within the inner bell 33 being rigidly supported therein by a transverse spider 36. It is preferable that the lower end of the tube 35 rest upon the casing 10 as is clearly shown in Figure 3. A vent tube 37 extends downwardly within the tube 35 and has its lower open end spaced from the bottom of this latter tube. The upper end of the vent tube 37 is curved and extends from the open end of the tube 35, the extreme upper end of the vent tube being secured in the side wall of the inner bell 33.

With this arrangement, it will be obvious that the chlorine entering the inner bell 33 through the conductor 29 may pass downwardly into the tube 35 and then upwardly through the vent tube 37, whereby said chlorine may pass into the space between the inner bell 33 and the outer bell 32.

A water inlet pipe 38 has its upper end provided with a reduced orifice 39 whereby water may be introduced into the space between the shell 31 and the bell 32. From this space the water flows through openings 32' provided in the lower end of the outer bell 32 and into the space between the inner and outer bells. The water may also pass beneath the inner bell 33 so as to enter therein and from the inner bell 33 said water will flow into the tube 35. Normally a water level is maintained within the metering apparatus by a water overflow pipe or outlet 40, which pipe extends upwardly from within the casing 10 into the space between the inner and outer bells 32 and 33 respectively.

As clearly shown in Figure 3, the water is normally standing within the metering apparatus at the level A which is in horizontal alinement with the upper end of the outlet pipe 40. As the chlorine is entered into the inner bell 33 to the conductor 29, it will be obvious that the water level in said bell will be forced downwardly within the bell. As the volume of chlorine fills up within the bell 33 the water within said bell will be continued to be forced downwardly and into the space between the inner and outer bell. At the same time the water within the tube 35 will be forced downwardly in said tube and outwardly through the vent tube 37. Of course, so long as the water level in the tube 35 is covering the open lower end of the vent tube 37, gas from within the inner bell 33 cannot escape. However, as soon as sufficient chlorine has been introduced into the bell 33 to lower the water level within said bell and within the tube 35 to a point below the vent tube 37, then it is obvious that the chlorine within the tube 35 and bell 33 may escape through the vent tube. As soon as the seal is broken at the lower end of the vent tube the weight of the water outside of the inner bell 33 will immediately force the chlorine which is within the bell 33 into the tube 35 from where it can escape through the vent tube 37. Therefore, it will be seen that as the volume of chlorine increases to a predetermined amount, the water within the inner bell 33 and tube 35 will be displaced so as to break the water seal at the lower end of the vent tube 37. When this occurs the chlorine may escape upwardly through the vent tube 37. It is aided in its escape by the weight of the water in the apparatus which is tending at all times to seek its own level and rush back into the inner bell 33.

The water is kept at the constant level by means of the overflow or outlet pipe 40 and also by the constant introduction of more water through the water inlet pipe 38. The chlorine which escapes from the vent tube 37 passes into the space between the inner bell 33 and the outer bell 32 and is trapped above the water level. Of course, some of the chlorine will enter into solution with the water in the metering apparatus but the majority thereof will be in the form of a gas within the bell 32. The chlorine gas is taken from the bell 32 to be mixed with a water supply through the outlet 40 on which a vacuum is exerted, as will be explained.

It will be obvious that with this metering device a predetermined amount of chlorine will escape through the vent tube 37 upon each pulsation and thus, by determining the number of pulsations per minute or over any given length of time, it is possible to accurately determine the amount of chlorine which is being introduced into a water supply.

A water inlet conductor 41 extends through the wall of the casing 10 near the lower end thereof and then extends upwardly within the casing, as is clearly shown in Figure 1. The conductor 41 has suitable metering devices 42 connected therein, whereby the pressure of the water may be controlled. The upper metering device 42 is connected by a line 43 with the lower end of the water inlet line 38, which line extends upwardly through the top of the casing into the metering apparatus 30. The metering device 42 which is connected in the water line is so adjusted that a predetermined amount of water is constantly supplied to the shell 31 of the meter 30.

The majority of the water from the inlet conductor 41 passes through horizontal line 44, which line is connected with a vertical pipe 45. This latter pipe has its upper end extending into a housing 46. The housing has a chamber 47 located therein and the end of the pipe 45 is provided with an injector nozzle 48, which nozzle is located within the chamber 47. Thus, the water from the inlet conductor 41 passes to the pipe 45 and is ejected therefrom through the nozzle 48 into an outlet pipe 49 which connects to the chamber 47 and extends downwardly therefrom. The outlet 49 passes from the lower end of the housing 46 and has its extreme lower end connected in the water supply line 50 which line leads to the water main or other source of consumer supply. Therefore, it will be seen that the water to be chlorinated passes through the pipe 45, is ejected from the nozzle 48 and into the outlet 49. At the point where the water is ejected from the nozzle, it will be obvious that a vacuum will be created in the chamber 47 due to the ejection of the water from said nozzle. Thus the water is utilized to provide a syphon pump injector. The gas outlet pipe 40 which has its upper end located within the metering apparatus between the outer bell 32 and the inner bell 33, has its lower end connected in a T 51, which T is supported in the housing 46 and has its inner end communicating with the interior of the chamber 47. The lower end of the outlet line 40 communicates with a port 52 provided in the T 51, whereby the chlorine which is drawn from within the bell 32 passes into the housing 47 and thus, into the outlet line 49. It is noted that it is the syphon pump, or the action of the water escaping from the nozzle 48 which creates the vacuum sufficient to draw the chlorine from within the bell 32. It is noted that some of the water within the metering apparatus 30 will overflow into the pipe 40 and this water along with the chlorine will be passed to the outlet 49.

From the above, it will be seen that the chlorine is introduced through the inlet 12 and into the diaphragm case 14 where it will act upon the diaphragm 16 to actuate the bar 19, which bar controls the position of the metering pin 22. Therefore, the pressure of the chlorine is utilized to control the amount of chlorine which passes the metering pin 22 and flows to the conductor 29 which leads to the metering aparatus 30. A suitable pressure gauge 12' may be connected in the inlet line 12 to indicate the pressure of the incoming chlorine.

From the conductor 29 the chlorine is delivered to the inner bell 33 and when sufficient chlorine has been introduced into this bell and the water level therein has been forced downwardly in order to break the seal at the lower end of the vent tube 37, then the chlorine is permitted to escape through the tube 37 and into the bell 32. The water level in the metering apparatus is, of course, maintained by means of the overflow outlet pipe 40 and the water inlet pipe 38 which is constantly delivering water to the metering apparatus. The gas which has escaped into the outer bell 32 is drawn therefrom to the outlet pipe 40 by the action of the syphon pump which is actuated by the incoming water supply from the pipe 45, which pipe is, of course, supplied with water through its connection with the inlet conductor 41. From the pump housing 46 the water and chlorine will flow together through the outlet 49 and to the line 50 which leads to the source of consumer supply.

The metering apparatus 30 permits the operator to know at all times just how much chlorine is being delivered to the water. The provision of the metering pin 22 and the valve seat 27 provide for an automatic control of the chlorine which is introduced to the metering apparatus, dependent upon the pressure of the incoming chlorine. The action is entirely automatic and once the parts are adjusted there is no further need for attention.

It has been found that sometimes the water supply from the conductor 41 will fail or, in other cases, the syphon pump injector will fail to operate properly. For this reason, it is desirable that in case of a failure of any part of the apparatus for any reason, that the chlorine from the inlet line 12 be cut off. Means for automatically seating the metering pin 22 upon its seat 27 to cut off the flow of chlorine to the metering apparatus is provided for this purpose.

This means is clearly shown in Figure 4 and comprises a diaphragm case 53 which case has a transverse partition 54 located centrally therein, whereby said case is divided into two diaphragm chambers 55 and 56. The chamber 55 has a transverse diaphragm 57 located therein and the stem 57' of this diaphragm extends outwardly through a stuffing box 58 in the case. A coil spring 59 exerts its tension at all times to urge the diaphragm inwardly toward the center of the case 53. The outer end of the diaphragm stem 57' is pivotally secured near the lower end of the control bar 19, which bar has its upper end secured to the stem 16' of the diaphragm 16. Due to the coil spring, it will be obvious that the lower end of the control bar 19 is being urged inwardly at all times, whereby the tendency is to seat the metering pin 22 on its seat 27 within the valve housing 23. To overcome the tension of the spring 59 so as to position the lower end of the bar 19 to hold the pin 22 off its seat and also for holding the lower end of the bar 19 in a relatively fixed position during the operation of the device, a water pressure is maintained in the diaphragm chamber 55. For conducting water to the chamber 55 so as to create this pressure a water pipe 60 is connected to the pipe 44, which latter pipe leads from the water inlet conductor 41. The pipe 60 is secured in one side of a valve housing 61, whereby water is introduced into said valve housing. The water from the pipe 60 will flow past a valve seat 62 and a valve 63 and will enter a conductor 64 connected in the side of the valve housing 61. The other end of the conductor 64 is connected in the diaphragm case 53 and communicates with the interior of the diaphragm chamber 55. The valve 63 is provided with a threaded stem 63' which has a hand wheel at its outer end, whereby the valve may be adjusted with relation to the seat 62, which makes for a positive control of the amount of water flowing to the diaphragm chamber 55.

From the above, it will be seen that the water from the conductor 41 may flow into the diaphragm chamber 55 and its pressure will act against said diaphragm 57, to move the same against the tension of the coil spring 59. For maintaining a relatively constant pressure of water within the diaphragm chamber 55 a lead pipe 65 has one end connected in the side of the diaphragm case 53 opposite the point of connection between the conductor 64 and said case. The upper end of the conductor 65 is connected in one side of a valve housing 66. The valve housing is provided with a valve seat 67 and a metering pin 68 is adapted to engage this seat. On the opposite side of the valve seat and connected in the housing 66 is an outlet conductor 69 which has its opposite end leading to a suitable drain. With this arrangement, it will be seen that water from the diaphragm chamber 55 may flow upwardly through the conductor 65 and past the metering pin 68 and valve seat 67 and enter the conductor 69, from where it may be carried to a suitable drain. It will be obvious that by restricting the opening or orifice between the metering pin 68 and its seat 67, a back pressure will be set up and, therefore, by adjusting the pin 68, it is possible to maintain a predetermined water pressure in the diaphragm chamber 55.

For holding the metering pin 68 in a fixed and predetermined position with relation to its valve seat 67, the outer end of the pin is pivoted at 70 to an elongate vertical control bar 71. The extreme upper end of the control bar is pivoted to a suitable arm 72, while the lower end of said bar is pivotally connected with the diaphragm stem 73' of a diaphragm 73. The diaphragm 73 is suitably mounted within the diaphragm chamber 56 formed within the case 53. A coil spring 74 surrounds the outer end of the stem 73' and exerts its tension to at all times urge the lower end of the control bar 71 outwardly away from the diaphragm case. It is noted that as this lower end of the bar 71 moves outwardly away from the case 53, the metering pin 68 is moved further from its seat 67 whereby a greater flow of water may pass from the pipe 65 to the conductor 69. A reverse movement or a movement in the opposite direction of the lower end of this control bar will, of course, move the metering pin 68 closer to its valve seat to provide a more restricted opening.

For overcoming the tension of the spring 74 so as to hold the control bar 71 in its proper position, whereby the metering pin 68 is spaced the proper predetermined distance from its seat, a tubular line 75 has one end connected in the case 53 and communicating with the interior of the diaphragm chamber 56. The other end of this conductor or line communicates with a port 53 which is formed in the T 51 of the syphon pump. The opposite end of the port 52 communicates with the interior of the chamber 47 of said pump. With this arrangement, it will be obvious that the vacuum which is created in the pump and which serves to draw the chlorine through the outlet pipe 40 will be exerted on the face of the diaphragm 73 whereby it will tend to pull the diaphragm toward the center of the case 53. This movement of the diaphragm will overcome the spring tension on the diaphragm stem and by properly adjusting the pump, a predetermined vacuum may be exerted on the diaphragm 73 to properly hold the lower end of the control bar 71 in a predetermined position. Therefore, the metering pin 68 will be held, under normal operating conditions, a proper distance from its seat 67 and, therefore, a predetermined back pressure will be built up on the water in the pipe 65 and diaphragm chamber 55, whereby the control bar 19 will also be held in its proper position. Under normal operating conditions, the parts will be in the position shown in Figure 4 and so far as the diaphragms 57 and 73 within the diaphragm case are concerned, these diaphragms are inactive. In the event that the vacuum in the pump chamber 47 should, for any reason, fail then it will be obvious that there will be no vacuum exerted against the diaphragm 73 in the case 53. When this occurs, the coil spring 74 which surrounds the diaphragm stem 73', will immediately move the diaphragm 73 so as to swing the lower end of the control bar 71 outwardly away from the case 53. When this occurs the metering pin 68 is immediately swung outwardly away from its seat so as to permit a greater flow of water between the pipe 65 and its outlet conductor 69. As soon as the restricted opening at the valve seat 67 is enlarged, the flow of water through the pipe 65 to the conductor 69 will increase in volume. This increased flow of the water to the outlet 69 will, of course, immediately lower the pressure in the diaphragm chamber 55 and this decrease of pressure permits the coil spring 59 to immediately move the diaphragm 57 toward the center of the case 53. This inward movement of the diaphragm will, of course, swing the lower end of the control bar 19 toward the case 53, which action will move the metering pin 22 inwardly onto its seat 27, whereby the flow of chlorine from the pipe 28 to the conductor 29 is cut off. Therefore, if for any reason the vacuum in the pump 46 should fail, the supply of chlorine to the metering apparatus 30 and then subsequently to the water supply, is immediately shut off.

If the water supplied from the conductor 41 should fail, this would result in a failure of the vacuum in the chamber 47 and the same action as above described would take place, whereby the chlorine would immediately be shut off. It is noted that so long as the water is supplied and a vacuum which is necessary to draw the chlorine from the metering apparatus is present, then the parts will be in the position shown in Figure 4. If the water supply or head in the conductor 41 should become less, then a resultant reduction in vacuum would take place in the chamber 47. This decreased vacuum acting upon the diaphragm 73 in the case 53 would, of course, cause a slight swinging of the lower end of the control bar 71, and the metering pin 68 would be adjusted with relation to its seat 67 in accordance with such decrease in vacuum. The adjustment of the metering pin 68 would, of course, vary the pressure of the water in the diaphragm chamber 55 and this would also result in a swinging of the control bar 19 and a subsequent adjustment of the metering pin 22 to change the amount of chlorine flowing to the valve housing 23 through the conductor 29. Therefore, the provision of the double diaphragm case 53, together with its associate parts, not only acts as a safety device which automatically cuts off the chlorine supply in the event of any failure of the other apparatus, but also provides a means for automatically adjusting the flow of the chlorine to the metering apparatus 30 in accordance with the amount of water flowing through the pump 46. This positively assures the proper amount of chlorine being supplied to the water at all times and under all conditions.

What I claim and desire to secure by Letters Patent, is:

1. A chlorinator including, a casing, a metering apparatus supported by the casing, a water line passing through the casing, means for delivering chlorine to the metering apparatus, a pulsator within said apparatus for metering the chlorine to be introduced into the water, a conductor leading from said apparatus to the water line whereby chlorine is introduced into said line, and means for controlling the flow of chlorine to the metering apparatus according to the pressure of the water in the line, whereby a proper amount of chlorine is delivered to the water.

2. A chlorinator including, a casing, a metering apparatus supported by the casing, a water line passing through the casing, means for delivering chlorine to the metering apparatus, a pulsator within said apparatus for metering the chlorine to be introduced into the water, a conductor leading from said apparatus to the water line whereby chlorine is introduced into said line, and automatically operated means for controlling the flow of chlorine to the metering apparatus according to the pressure of the water in the line, whereby a proper amount of chlorine is delivered to the water.

3. A chlorinator including, a casing, a metering apparatus supported by the casing, a water line passing through the casing, means for delivering chlorine to the metering apparatus, a pulsator within said apparatus for metering the chlorine to be introduced into the water, a conductor leading from said apparatus to the water line whereby chlorine is introduced into said line, means for controlling the flow of chlorine to the metering apparatus according to the pressure of the water in the line, whereby a proper amount of chlorine is delivered to the water, and means for automatically shutting off the flow of chlorine to the metering apparatus in the event that the water supply fails.

4. A chlorinator including, a casing, a metering apparatus supported by the casing, a water line passing through the casing, means for delivering chlorine to the metering apparatus, a pulsator within said apparatus for metering the chlorine to be introduced into the water, a conductor leading from said apparatus to the water line whereby chlorine is introduced into said line, automatically operated means for controlling the flow of chlorine to the metering apparatus according to the pressure of the water in the line, whereby a proper amount of chlorine is delivered to the water, and means for automatically shutting off the flow of chlorine to the metering apparatus in the event that the water supply fails.

5. A chlorinator including, a casing, a chlorine metering apparatus mounted on the casing, a water line passing through the casing, means for delivering water to the metering apparatus, means for delivering chlorine to the metering apparatus, a conductor leading from said apparatus to the water line, a syphon pump connected in the water line for drawing chlorine from the metering apparatus to the water line, means for controlling the flow of chlorine to the metering apparatus according to the water flowing through the water line, whereby a proper amount of chlorine is delivered to the water, and means actuated by the pressure of the water in the line and by the vacuum created by the pump for automatically shutting off the chlorine supply in the event that the pump fails.

6. A chlorinator including, a casing, a chlorine metering apparatus mounted on the casing, a water line passing through the casing, means for delivering water to the metering apparatus, means for delivering chlorine to the metering apparatus, a conductor leading from said apparatus to the water line, a syphon pump connected in the water line for drawing chlorine from the metering apparatus to the water line, a valve for controlling the flow of chlorine to the metering apparatus, pressure responsive means actuated by the pressure of the chlorine connected with said valve, and pressure responsive means actuated by the pressure of the water in the line also connected with said valve, whereby the position of the valve is directly controlled by the chlorine and water pressure to deliver a proper amount of chlorine to the water.

7. A chlorinator including, a casing, a metering apparatus supported by the casing, a water line passing through the casing, means for delivering water to the metering apparatus, means for delivering chlorine to the metering apparatus, a pulsator within said apparatus for metering the chlorine to be introduced into the water, a conductor leading from said apparatus to the water line whereby chlorine is introduced into said line, a valve for controlling the flow of chlorine to the metering apparatus, pressure responsive means actuated by the pressure of the chlorine connected with said valve, and pressure responsive means actuated by the pressure of the water in the line also connected with said valve, whereby the position of the valve is directly controlled by the chlorine and water pressure to deliver a proper amount of chlorine to the water.

8. A chlorinator including, a casing, a chlorine metering apparatus mounted on the casing, a water line passing through the casing, means for delivering chlorine to the metering apparatus, a conductor leading from said apparatus to the water line, a syphon pump connected in the water line for drawing chlorine from the metering apparatus to the water line, a valve for controlling the flow of chlorine to the metering apparatus, pressure responsive means actuated by the pressure of the chlorine, pressure responsive means actuated by the pressure of the water in the line, means for connecting the chlorine pressure responsive means and the water pressure responsive means with said valve, whereby the position of the valve is directly controlled by the chlorine and water pressure to deliver a proper amount of chlorine to the water, and a third pressure responsive means actuated by the suction of the syphon pump for controlling the water pressure acting upon its respective pressure responsive means, whereby in the event of failure of the pump, the control valve is automatically closed to shut off the chlorine.

9. A chlorinator including, a casing, a metering apparatus mounted on the casing and comprising a shell, a pair of inverted bells one within the other disposed within the shell, a container within the inner bell, a vent tube leading from said container to the space between the bells, means for maintaining a water level in the shell to submerge the vent tube, means for delivering chlorine to the inner bell whereby when the volume of chlorine reaches a predetermined amount, the water level therein is forced downwardly to uncover the vent tube and permit escape of the chlorine into the space between the bells, a water line passing through the casing and having connection with the space between the bells whereby chlorine is introduced into said line, and means for controlling the flow of chlorine to the metering apparatus according to the pressure of the water in the line, whereby a proper amount of chlorine is delivered to the water.

10. A chlorinator including, a casing, a metering apparatus mounted on the casing and comprising a shell, a pair of inverted bells one within the other disposed within the shell, a container within the inner bell, a vent tube leading from said container to the space between the bells, means for maintaining a water level in the shell to submerge the vent tube, means for delivering chlorine to the inner bell whereby when the volume of chlorine reaches a predetermined amount, the water level therein is forced downwardly to uncover the vent tube and permit escape of the chlorine into the space between the bells, a water line passing through the casing and communicating with the space between the bells whereby chlorine is introduced into said line, means for controlling the flow of chlorine to the metering apparatus according to the pressure of the water in the line, whereby a proper amount of chlorine is delivered to the water, and means for automatically shutting off the flow of chlorine to the metering apparatus in the event that the water supply fails.

WILLIAM C. BLACKMOND.